US012722881B1

(12) United States Patent
Barra

(10) Patent No.: US 12,722,881 B1
(45) Date of Patent: Sep. 1, 2026

(54) METHOD AND APPARATUS FOR COLLECTION AND DISPOSAL OF RUBBISH AND OTHER WASTE MATERIALS

(71) Applicant: Tote Away, LLC, Lafayette, LA (US)

(72) Inventor: Marc T. Barra, Lafayette, LA (US)

(73) Assignee: Tote Away, LLC, Lafayette, LA (US)

( * ) Notice: Subject to any disclaimer, the term of this patent is extended or adjusted under 35 U.S.C. 154(b) by 0 days.

(21) Appl. No.: 18/652,335

(22) Filed: May 1, 2024

Related U.S. Application Data

(60) Provisional application No. 63/499,744, filed on May 3, 2023.

(51) Int. Cl.
*B65F 1/00* (2006.01)
*B65F 1/06* (2006.01)

(52) U.S. Cl.
CPC .......... *B65F 1/0013* (2013.01); *B65F 1/0093* (2013.01); *B65F 1/06* (2013.01); *B65F 2210/102* (2013.01); *B65F 2210/18* (2013.01); *B65F 2220/1063* (2013.01); *B65F 2230/148* (2013.01); *B65F 2250/1143* (2013.01)

(58) Field of Classification Search
CPC .... B65F 1/0006; B65F 1/0013; B65F 1/0093; B65F 1/06; B65F 1/1415; B65F 2210/102; B65F 2210/18; B65F 2220/1063; B65F 2230/148; B65F 2250/1143; A47G 29/20; A47G 2029/144; D06F 95/002; D06F 95/004
See application file for complete search history.

(56) References Cited

U.S. PATENT DOCUMENTS

| | | | | | |
|---|---|---|---|---|---|
| 5,960,983 | A * | 10/1999 | Chan | B65F 1/02 220/666 |
| D434,890 | S * | 12/2000 | Cooper | D34/1 |
| 6,520,365 | B2 * | 2/2003 | Schneider | D06F 95/002 220/666 |
| 7,815,069 | B1 * | 10/2010 | Bellofatto | B65D 81/3886 220/666 |
| 8,511,895 | B2 * | 8/2013 | Burchfield | B65F 1/1415 383/33 |
| D733,378 | S * | 6/2015 | Benson | D32/37 |
| 9,616,465 | B1 * | 4/2017 | Strawn | B07B 1/06 |
| 10,518,971 | B2 * | 12/2019 | Butler | B65F 1/002 |
| 10,829,300 | B1 * | 11/2020 | Via | B65F 1/1426 |
| 11,053,070 | B2 * | 7/2021 | Butler | B65F 1/141 |
| 11,242,197 | B2 * | 2/2022 | Lee | B65F 1/06 |
| 11,801,995 | B1 * | 10/2023 | Glenn | B65F 1/0006 |
| 12,195,910 | B2 * | 1/2025 | Abrams | A45C 13/103 |
| 12,296,057 | B2 * | 5/2025 | Wen | A61L 2/26 |
| 12,329,303 | B1 * | 6/2025 | McNaboe | A47G 29/30 |
| 2003/0015527 | A1 * | 1/2003 | Schneider | A45C 7/0077 220/9.2 |

(Continued)

FOREIGN PATENT DOCUMENTS

DE 19835618 A1 * 2/2000 ................ B65F 1/14

*Primary Examiner* — William L Miller
(74) *Attorney, Agent, or Firm* — Ted. M. Anthony; Sarah B. Dupont

(57) ABSTRACT

A collapsible container that can be collapsed for easy and convenient storage during periods of non-use. The collapsible container can be quickly and efficiently expanded and deployed for the storage, collection and/or transportation of rubbish, particularly in connection with disposal thereof. The collapsable container can be used in connection with a valet or concierge system of rubbish removal and disposal such as in apartment complexes, hotels and other locations.

10 Claims, 5 Drawing Sheets

(56) References Cited

U.S. PATENT DOCUMENTS

2003/0015528 A1* 1/2003 Schneider .............. B65D 37/00 220/9.2
2003/0106895 A1* 6/2003 Kalal ................... B65D 21/086 220/9.2
2003/0183630 A1* 10/2003 Schneider ............. D06F 95/002 220/9.2
2004/0089665 A1* 5/2004 Nnamani .............. B65F 1/1607 220/495.08
2005/0284866 A1* 12/2005 Oakner ................. B65F 1/1415 220/9.2
2006/0078987 A1* 4/2006 Krier ..................... B65F 1/1415 435/290.1
2008/0056625 A1* 3/2008 Stanton ................. B65F 1/0006 220/9.3
2011/0150369 A1* 6/2011 Burchfield ............ B65F 1/0006 383/33
2013/0056373 A1* 3/2013 Benson ................ A45C 7/0077 206/278
2013/0188889 A1* 7/2013 Fraser ................... B65F 1/0006 383/37
2013/0284753 A1* 10/2013 Kellmann ................. B65F 1/02 220/666
2015/0053687 A1* 2/2015 Greenspon ........... B65D 21/086 220/490
2015/0210470 A1* 7/2015 Melloul ................ B65F 1/0006 405/129.6
2015/0314956 A1* 11/2015 Clevenger ............... B65F 1/002 220/9.1
2016/0052710 A1* 2/2016 Butler ..................... B65F 1/141 220/560
2016/0167832 A1* 6/2016 Silverman ............. D06F 95/002 220/9.2
2016/0333515 A1* 11/2016 Eckerman ............. D06F 95/002
2017/0144835 A1* 5/2017 Butler ..................... B65F 1/002
2020/0002087 A1* 1/2020 Lee ........................... B65F 1/06
2020/0029561 A1* 1/2020 Schneider .............. A01N 41/06
2020/0071030 A1* 3/2020 Ager ...................... B65D 37/00
2022/0010482 A1* 1/2022 Abrams ............... A45C 13/103
2022/0111083 A1* 4/2022 Johnson .................... A61L 2/10

* cited by examiner

METHOD AND APPARATUS FOR COLLECTION AND DISPOSAL OF RUBBISH AND OTHER WASTE MATERIALS

CROSS REFERENCES TO RELATED APPLICATIONS

This Application claims priority of U.S. Provisional Patent Application Ser. No. 63/499,744, filed May 3, 2023, incorporated herein by reference.

STATEMENTS AS TO THE RIGHTS TO THE INVENTION MADE UNDER FEDERALLY SPONSORED RESEARCH AND DEVELOPMENT

None

BACKGROUND OF THE INVENTION

1. Field of the Invention

The present invention pertains to a method and apparatus for collection and disposal of rubbish and other waste materials. More particularly, the present invention pertains to a collapsible apparatus that can be conveniently and efficiently deployed to collect, store and transport rubbish, particularly in connection with disposal thereof. More particularly still, the present invention pertains to a system of utilizing a collapsable apparatus in connection with a valet or concierge system of rubbish removal and disposal.

2. Brief Description of the Related Art

Valet services collect and transport rubbish and other waste materials from one location to another location for eventual disposal. Said services can collect rubbish/waste that is deposited at or near an apartment, and then transport said rubbish/waste in a common disposal facility, such as a dumpster or the like. Frequently, the rubbish/waste comprises household trash that is deposited by a resident outside the door of an apartment or other dwelling; the valet service periodically passes by said location(s), gathers or collects said trash, and then transports the trash to a dumpster or other disposal location.

Household trash can be unsightly, messy and unsanitary, particularly when said trash is deposited outside of an apartment door, in a hallway or other common area, or placed in a designated staging area awaiting pick up by a valet service. Such household trash is typically stored in paper or plastic bags that can leak or otherwise allow said trash (and particularly, but not exclusively, liquid or semi-liquid components thereof) to emit unpleasant odors and contaminate floors, walls and/or other nearby surfaces.

In certain cases, specially-designed, built in receptacles are installed outside apartment doors or at other staging areas; however, these receptacles can be relatively expensive to manufacture and install, take up space (which is often at a premium in many installation locations) and don't fully resolve the many problems associated with depositing said rubbish, particularly in high traffic areas.

Thus, there is a need for a convenient, efficient and cost-effective container that can be used to collect, store and transport rubbish and other waste materials including, without limitation, household trash and the like.

SUMMARY OF THE INVENTION

In a preferred embodiment, the present invention comprises a method of storing, collecting, transporting and/or disposing of rubbish and other waste materials including, without limitation, household trash. The method of the present invention utilizes a collapsible container that can selectively alternate between a first collapsed configuration that is compact and easily stored, and a second expanded configuration. When desired, said container can be quickly and efficiently converted to an expanded configuration that can hold relatively large amounts of said rubbish/waste materials.

In a preferred embodiment, said container can be constructed of heavy-duty canvas or other rugged material. A spring mechanism can bias said container in said open configuration, while quick-connect latches can secure and hold the container in said closed configuration. Said container can have a large cover that can be selectively opened and closed to provide access to the internal volume of said container and sealed (such as with a zipper or other sealing mechanism) when in said closed position. An impermeable liner can be provided within said container to prevent leakage of liquids or undesirable odors from the inner chamber formed by said container.

In one embodiment, the container of the present invention can be used by at least one resident in a multi-unit dwelling, such as an apartment complex, condominium unit or other similar arrangement. Said at least one resident can be provided with at least one container of the present invention, and can periodically deposit rubbish or other waste material in said at least one container. Said at least one container can then be transported to a dumpster or other disposal location, said rubbish or waste material can be removed from said at least one container, and said emptied container(s) can then be returned to the unit(s) for re-use. Collection of said rubbish or waste material can occur according to a predetermined schedule, when a predetermined amount of rubbish/waste has been deposited, and/or upon request.

BRIEF DESCRIPTION OF THE ANNOTATED DRAWINGS/FIGURES

The foregoing summary, as well as any detailed description of the preferred embodiments, is better understood when read in conjunction with the drawings and figures contained herein. For the purpose of illustrating the invention, the drawings and figures show certain preferred embodiments. It is understood, however, that the invention is not limited to the specific methods and devices disclosed in such drawings or figures.

Further, the drawings constitute a part of this specification and include exemplary embodiments of the present invention. It is to be understood that in some instances, various aspects of the invention may be shown exaggerated or enlarged to facilitate an understanding of the invention. Therefore, the drawings may not be to scale.

DETAILED DESCRIPTION OF A PREFERRED EMBODIMENT

Before describing various embodiments of the present disclosure in further detail by way of exemplary description, examples, and results, it is to be understood that the apparatus and methods of the present disclosure are not limited in application to the details of specific embodiments and examples as set forth in the following description. The description provided herein is intended for purposes of illustration only and is not intended to be construed in a limiting sense. As such, the language used herein is intended to be given the broadest possible scope and meaning, and the embodiments and examples are meant to be exemplary, not exhaustive. Also, it is to be understood that the phraseology and terminology employed herein is for the purpose of description only and should not be regarded as limiting unless otherwise indicated as so. Moreover, in the following detailed description, numerous specific details are set forth in order to provide a more thorough understanding of the present disclosure.

In a preferred embodiment, the present invention comprises a method of storing, collecting, transporting and/or disposing of rubbish and other waste materials including, without limitation, household trash. The method of the present invention utilizes a collapsible container that can selectively alternate between a first collapsed configuration that is compact and easily stored, and a second expanded configuration. When desired, said container can be quickly and efficiently converted to an expanded configuration that can hold relatively large amounts of said rubbish/waste materials.

Figure 1:
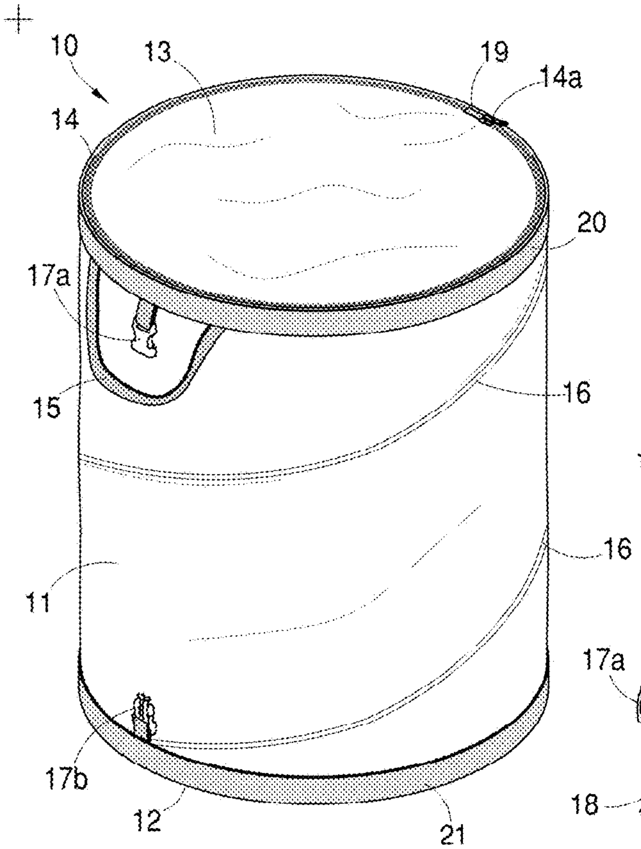
FIG. 1 depicts a side perspective view of a portable container of the present invention in an expanded and closed-lid configuration.

FIG. 1 depicts a side perspective view of a portable container 10 of the present invention in an expanded and closed configuration. In the embodiment depicted in FIG. 1, said portable container generally comprises interconnected side wall member 11 defining an upper end and lower end. Substantially flat base member 12 is disposed at said lower end, while substantially flat lid member 13 is disposed at said upper end.

In the embodiment depicted in FIG. 1, portable container 10 (and particularly side wall member 11) is substantially cylindrical in shape; however, it is to be understood that portable container 10 can have a different shape and/or dimensions without departing from the scope of the present invention. In this embodiment, support ring 21 can be disposed near the lower end of said side wall member 11, while support ring 20 can be disposed near the upper end of said side wall member 11. Support rings 20 and 21 are oriented in substantially parallel arrangement relative to each other and cooperate to maintain the substantially cylindrical shape of portable container 10. When said lid member 13 is in a closed position (as depicted in FIG. 1), said base member 12 and said lid member 13 are also oriented in a substantially parallel arrangement relative to each other. Nonetheless, it is to be observed that portable container member 10 can have many other optional shapes or configuration without departing from the scope of the present invention.

In a preferred embodiment, lid member 13 is operationally attached to side wall member 11 with hinge member 19. Said hinge member 19 permits said lid member 13 to alternate between a closed configuration (depicted in FIG. 1) and an open configuration (depicted in FIG. 6). Zipper 14 having zipper pull 14*a* extends around the circumference of the upper opening defined by side wall member 11 can be used to selectively secure lid member 13 to the upper end of side wall 11.

Still referring to FIG. 1, portable container 10 can include bias spring 16. In a preferred embodiment, said bias spring 16 comprises a coil spring that can be sewn or otherwise incorporated into side wall member 11. Said spring 16 can bias said portable container 10 into an expanded and upright configuration (as depicted in FIG. 1, for example) and permit said container 10 to remain in said configuration. However, spring 16 does not provide excessive resistance force and can be quickly and easily collapsed when desired. A quick-connect buckle 17 (comprising female member 17*a* and male member 17*b*) can be provided; when latched, said buckle 17 can restrain spring 16 from expanding and can selectively secure said portable container 10 in a collapsed configuration. Additionally, optional handle straps 15 can be provided for lifting said portable container 10, particularly when in an expanded configuration.

Figure 2:
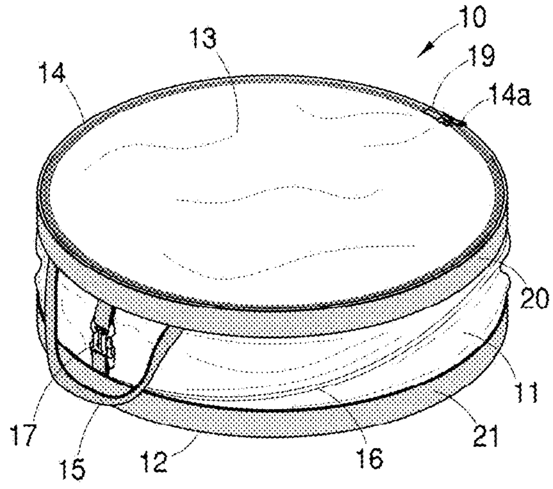
FIG. 2 depicts a perspective view of a portable container of the present invention in a collapsed and closed-lid configuration.

FIG. 2 depicts a perspective view of a portable container 10 of the present invention in a collapsed and closed configuration. In this configuration, spring 16 is substantially collapsed and quick-connect buckle 17 is latched. Said quick-connect buckle 17 restrains spring 16 from expanding, while securing and maintaining said portable container 10 in a collapsed configuration. When collapsed and latched as depicted in FIG. 2, portable container 10 takes up much less volume compared to the expanded configuration depicted in FIG. 1.

Figure 3:
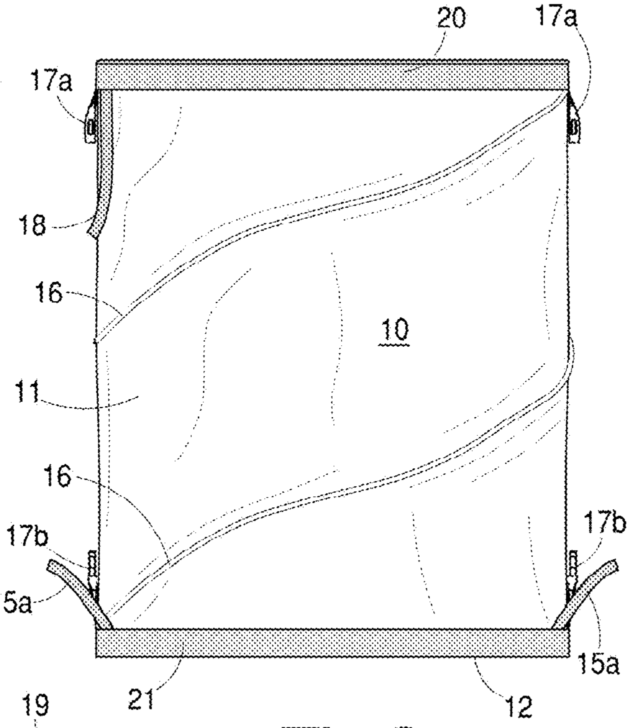
FIG. 3 depicts a side view of an alternative embodiment portable container of the present invention in an expanded and closed-lid configuration.

FIG. 3 depicts a side view of an alternative embodiment of a portable container 10 of the present invention in an expanded and closed configuration. Quick-connect buckle 17 is unlatched, while spring 16 biases said portable container 10 into an expanded and upright configuration. Side wall member 11 forms a continuous side structure having an upper end and lower end; substantially flat base member 12 is disposed at said lower end, while substantially flat lid member 13 is disposed at said upper end. Lid member 13 is in a closed configuration (about hinge member 19, not pictured in FIG. 3). Zipper 14 is closed in order to secure lid member 13 to the upper end of side wall 11 and block access into the inner portion of portable container 10. In the embodiment depicted in FIG. 3, portable container 10 further comprises lower handle straps 15*a*, as well as at least one upper handle strap 18 (although a plurality of upper handle straps 18 can be provided if desired). Quick-connect buckle 17 comprising female member 17*a* and male member 17*b* is provided.

Figure 4:
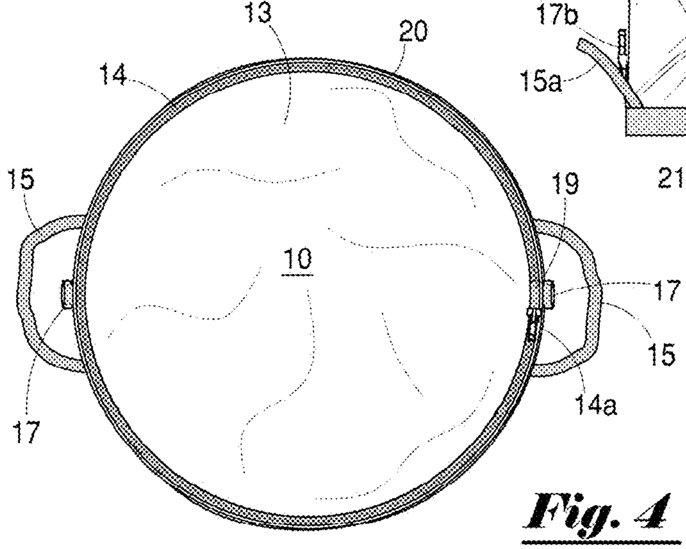
FIG. 4 depicts a top view of a portable container of the present invention in a closed-lid configuration.

FIG. 4 depicts a top view of a portable container 10 of the present invention in a closed configuration. Lid member 13 is operationally attached using hinge member 19 that permits said lid member 13 to selectively alternate between a closed configuration and an open configuration. Zipper 14 having zipper pull 14*a* extends around the circumference of upper support member 20 and can be used to selectively secure lid member 13 in a closed position. Quick-connect buckle 17 can be used to selectively secure said portable container 10 in a collapsed configuration, while optional handle straps 15 can be provided for lifting said portable container 10.

Figure 5:
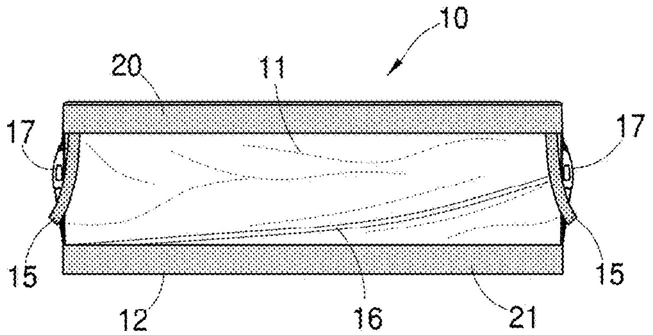
FIG. 5 depicts a side view of a portable container of the present invention in a collapsed and closed-lid configuration.

FIG. 5 depicts a side view of a portable container 10 of the present invention in a collapsed and closed configuration. Quick-connect buckle 17 is latched; said latched quick-connect buckle 17 is sufficiently strong to resist the force applied by spring 16 and hold said portable container 10 in a collapsed condition. Optional handle straps 15 can be provided for lifting said portable container 10. Support ring 21 is disposed near the lower end of said side wall member 11, while support ring 20 is disposed near the upper end of said side wall member 11. Base member 12 is substantially planar.

Figure 6:
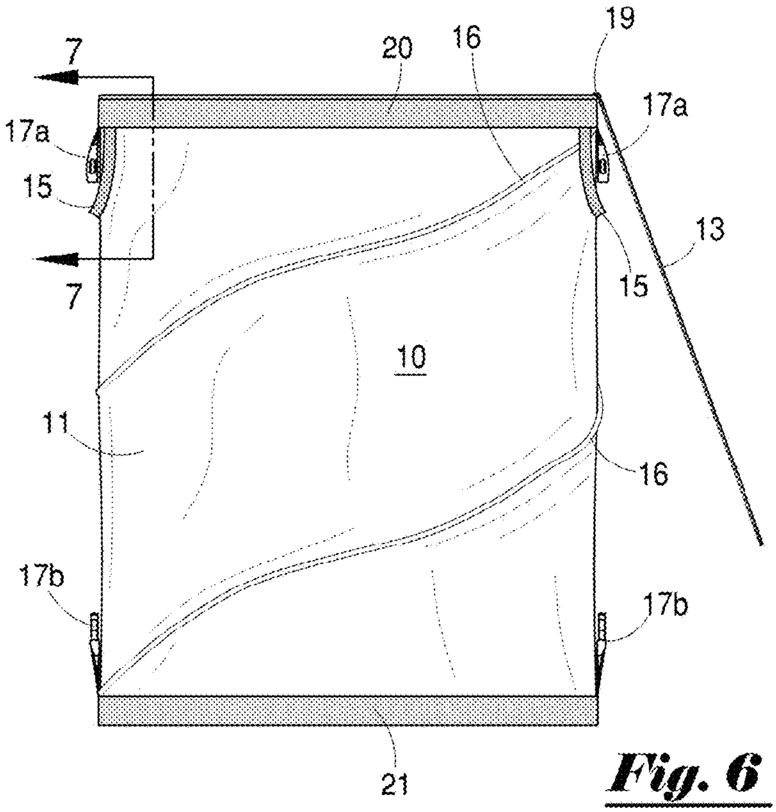
FIG. 6 depicts a side view of a portable container of the present invention in an expanded and open-lid configuration.

FIG. 6 depicts a side perspective view of portable container 10 of the present invention in an expanded and open-lid configuration. Portable container 10 generally comprises interconnected side wall member 11; substantially flat lid member 13 is disposed at said upper end and is attached to said side wall member 11 using hinge member 19. Support ring 21 is disposed near the lower end of said side wall member 11, while support ring 20 is disposed near the upper end of said side wall member 11. Bias spring 16 biases said portable container 10 into an expanded and upright configuration and permit said container 10 to remain in said configuration. Quick-connect buckle 17 (comprising female member 17*a* and male member 17*b*) can be provided to selectively secure said portable container 10 in a collapsed configuration. Optional handle straps 15 can be provided for lifting said portable container 10.

Figure 7:
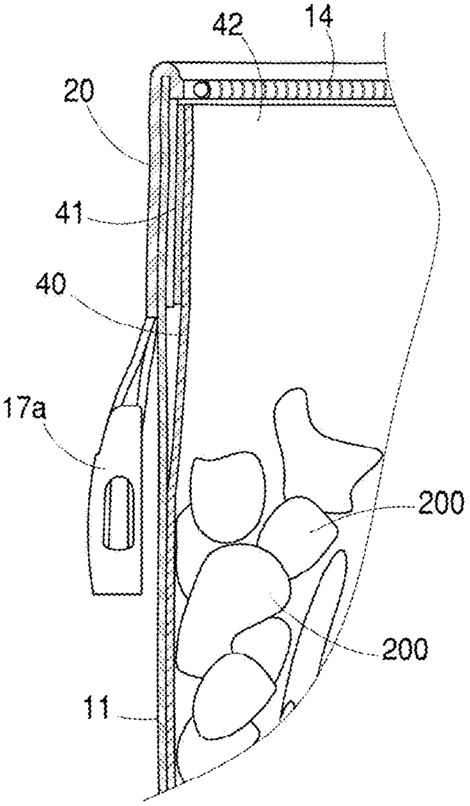
FIG. 7 depicts a sectional view along line 7-7 of FIG. 6.

FIG. 7 depicts a sectional view along line 7-7 of FIG. 6. Zipper 14 is disposed at the upper end of side wall 11, and runs along an upper rim or edge defined by said side wall 11. Side wall 11 can comprise, or have an outer shell or covering constructed of, heavy-duty canvas or other rugged material. In a preferred embodiment, portable container 10 further comprises a removable inner liner member 40. When installed within portable container 10, said removable inner liner member 40 defines an inner chamber or area 42 which is configured to receive rubbish 200 (or other desired contents).

Figure 8:
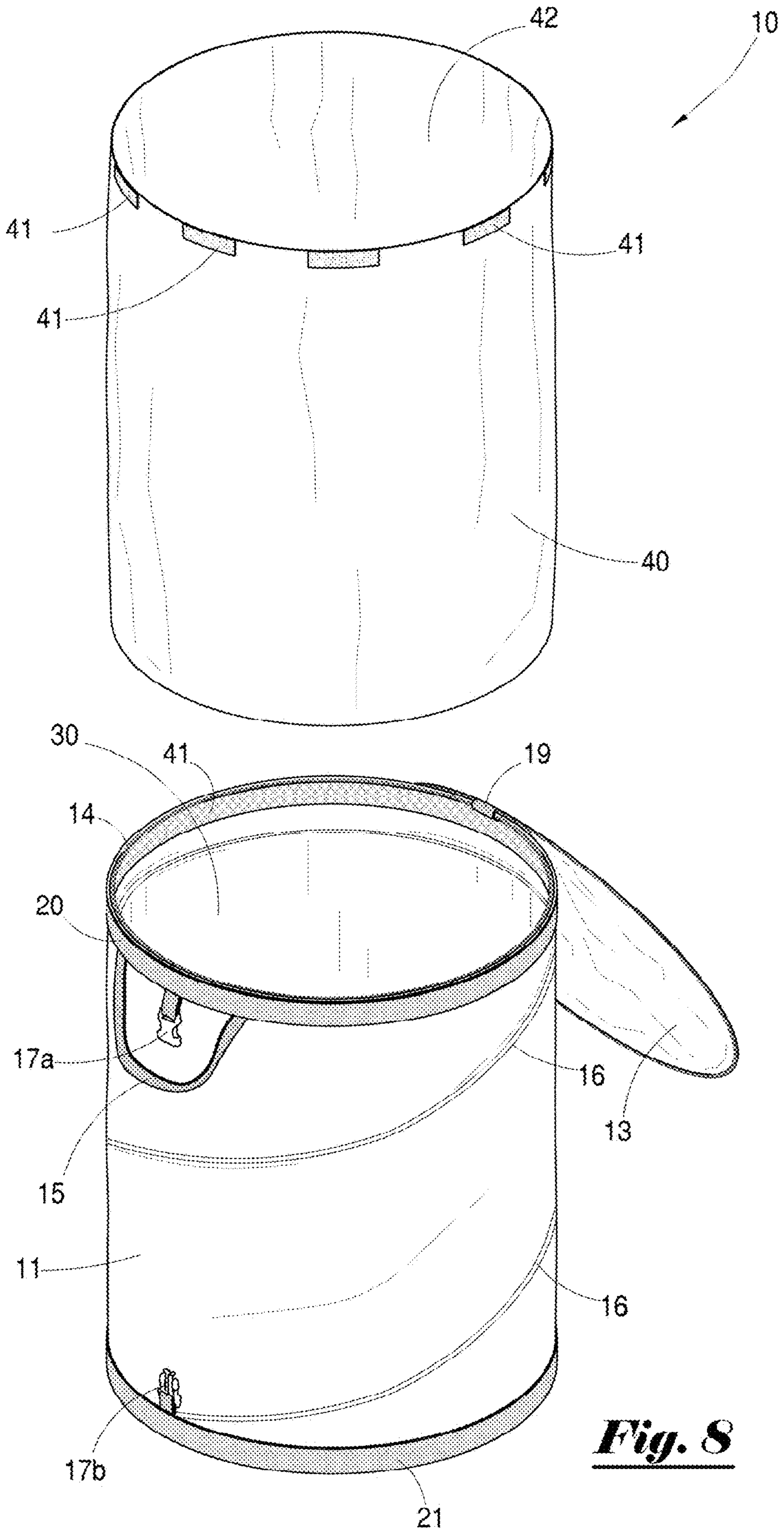
FIG. 8 depicts an exploded perspective view of a portable container of the present invention in an expanded and open-lid configuration.

FIG. 8 depicts an exploded perspective view of a portable container 10 in an expanded and open-lid configuration. Quick-connect buckle 17 is unlatched. Spring 16 biases said portable container 10 into an expanded and upright configuration and permits said container 10 to remain in said configuration. Zipper 14 is open/unzipped. Lid member 13 is in an open position about hinge member 19. It is to be observed that portable container 10 (and, more specifically, substantially cylindrical side wall member 11, cooperating with base 12) forms an internal chamber 30 defining a volume. It is to be understood that said volume can be adjusted by changing the dimensions of said portable container 10.

Spring 16 biases said container 10 in an open configuration; as depicted in FIG. 8, quick-connect buckle(s) 17 can be unlatched. Lid member 13 can be selectively opened to provide access to internal chamber 30 of said container 10. When closed, said lid member 13 can be secured in a closed position using zipper 14.

Still referring to FIG. 8, a removable liner member 40 can be installed within said portable container 10 and can comprise an impermeable barrier to prevent leakage of liquids or undesirable odors from the internal chamber 30 and/or any rubbish or other contents contained therein. When installed within portable container 10, said removable liner member 40 defines an inner chamber or area 42 which receive rubbish 200 (or other desired contents). Said removable liner member 40 can be attached to said side wall 11 of portable container 10 using fasteners 41; in a preferred embodiment, said fasteners 41 can comprise hook-and-loop fastener(s), zipper(s), crimp fastener(s) or other removable means for temporary attachment of removable liner member 40 within side wall 11.

Still referring to FIG. 8, removable liner 40 serves as a leak-proof mechanical vessel and containment barrier within side wall 11 of portable container 10. In a preferred embodiment, said removable liner 40 can be constructed of commercial polyethylene sheet film composite membrane that forms a barrier while allowing for some controlled absorption. Said removable liner 40 can be periodically treated (such as, for example, daily or on another predetermined schedule) with mechanical application of disinfectant(s) including, without limitation, biocide agent(s). Although other biocide agent(s) can be used without departing from the scope of the invention, said biocide agent(s) can include the product marketed under the mark "Odoban®". Further, said agent(s) can be applied as a mist on liner 40, promoting the killing of pathogenic microorganisms including, without limitation, viruses, staff, bacteria, fungus, mold, mildew, and the like. Using this simple process of applying biocide agent(s) to polymer surfaces is proven that excellent efficacy is established against both Gram-positive and Gram-negative bacteria, as well as against pathogenic fungi and enveloped viruses, and eradicates infection agents and disease.

Figure 9:
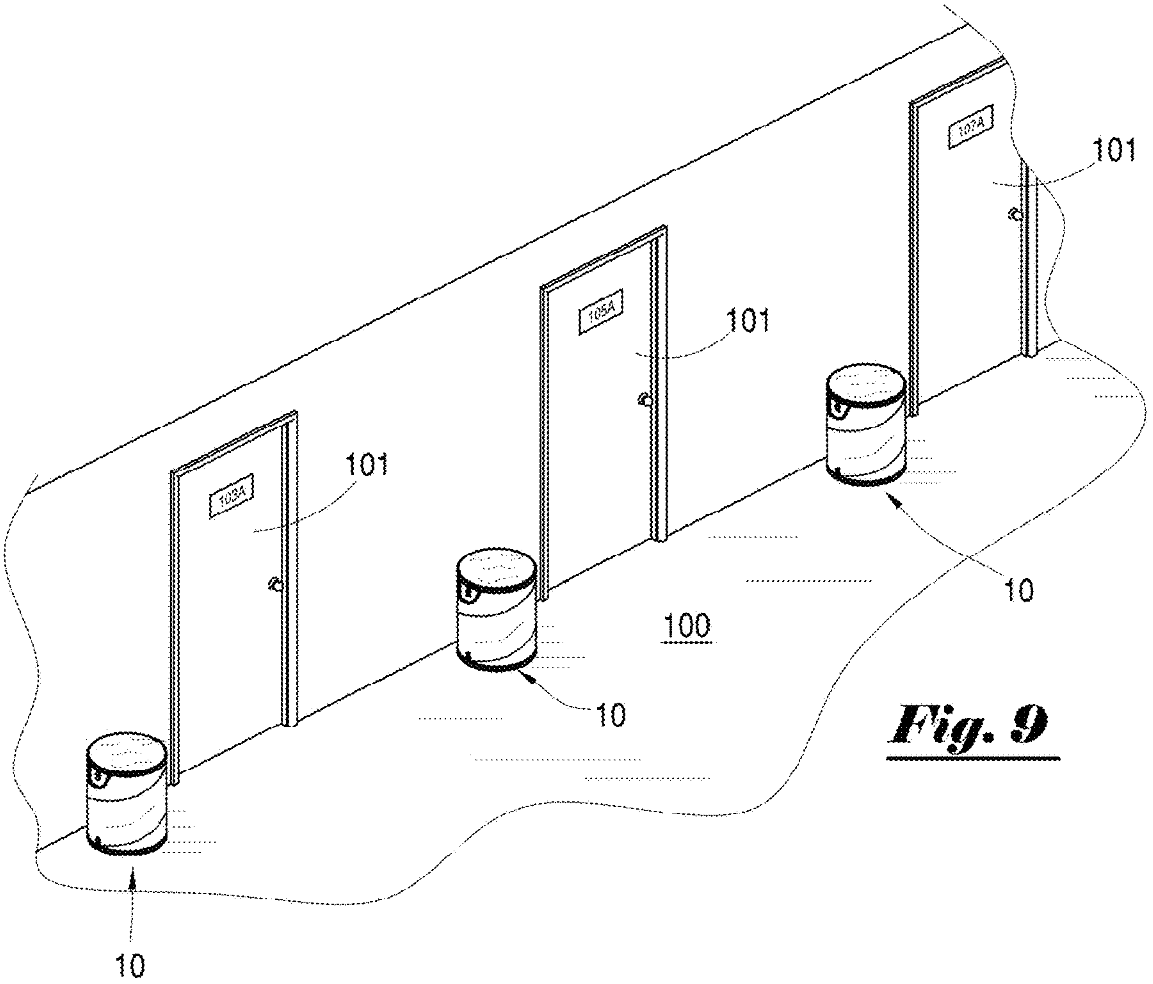
FIG. 9 depicts a perspective view of a hallway of an apartment complex with multiple portable containers, each in an expanded configuration, positioned in said hallway.

FIG. 9 depicts a perspective view of an exemplary hallway 100 of an apartment complex with multiple portable containers 10, each in an expanded configuration, positioned within said hallway 100. In one embodiment, portable container 10 of the present invention can be used by at least one resident in a multi-unit dwelling, such as an apartment complex, condominium unit or other similar arrangement. Said at least one resident can be provided with at least one portable container 10 of the present invention, and can periodically deposit rubbish or other waste material in said at least one portable container 10. In a preferred embodiment, said at least on portable container(s) 10 (containing rubbish or other contents) can then be placed at desired locations within hallway 100; in the embodiment depicted in FIG. 9, said portable containers 10 are positioned in general proximity to residence doors 101.

Said at least one portable container 10 can then be transported to a dumpster or other disposal location. Said rubbish or waste material can be removed from said at least one container, and said emptied container(s) can then be cleaned and returned to its original location (or some other predetermined location) for re-use. Collection of said rubbish or waste material can occur according to a predetermined schedule, when a predetermined amount of rubbish/waste has been deposited, and/or upon request.

Figure 10:
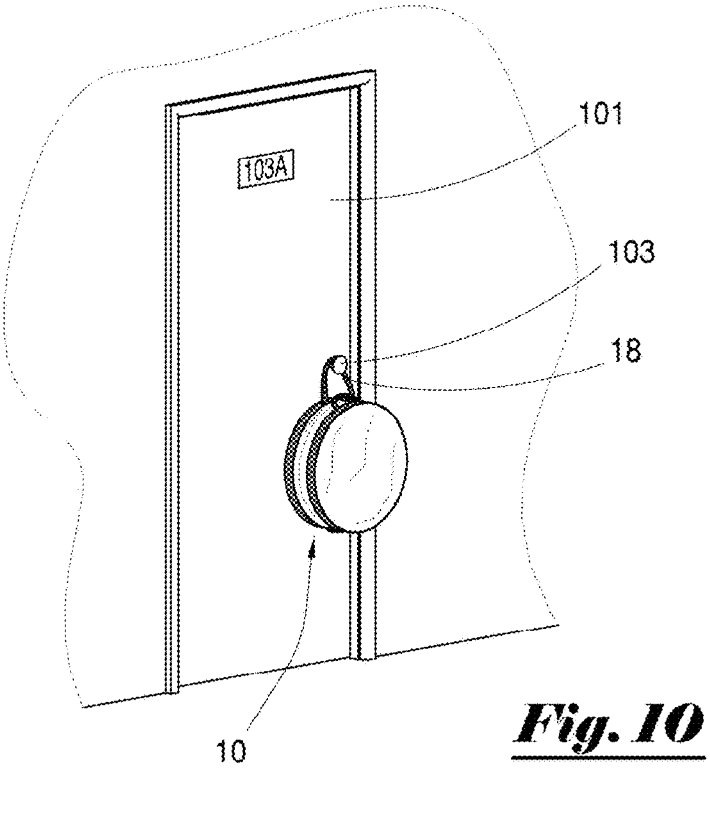
FIG. 10 depicts a perspective view of a hallway of an apartment complex with a portable container in a collapsed configuration positioned in said hallway.

FIG. 10 depicts a perspective view of hallway 100 of an apartment complex with a portable container 10 in a collapsed configuration, having been returned to said hallway 100. In a preferred embodiment as depicted in FIG. 10, said portable container 10 can be returned to user(s) by being hung on a door knob 103 using a handle strap 18. It is to be observed that a user can slip said container handle strap 18 over a wrist while turning door knob 103 for entry into doorway 101, thereby allowing for hands-free control and movement of said container 10 beyond said doorway (such as, for example, into a residence or the like). Placement of said at least one collapsable container 10 in this manner represents a significant safety feature because it eliminates the hazards of trip and falls from collapsed containers spread throughout a hallway or other walkway. Additionally, the configuration depicted in FIG. 10 and associated method of returning portable container 10 by hanging said collapsed container 10 on door knob 103 further creates an appealing cosmetic and uniform appearance, while also promoting sanitary use of container(s) 10.

Figure 11:
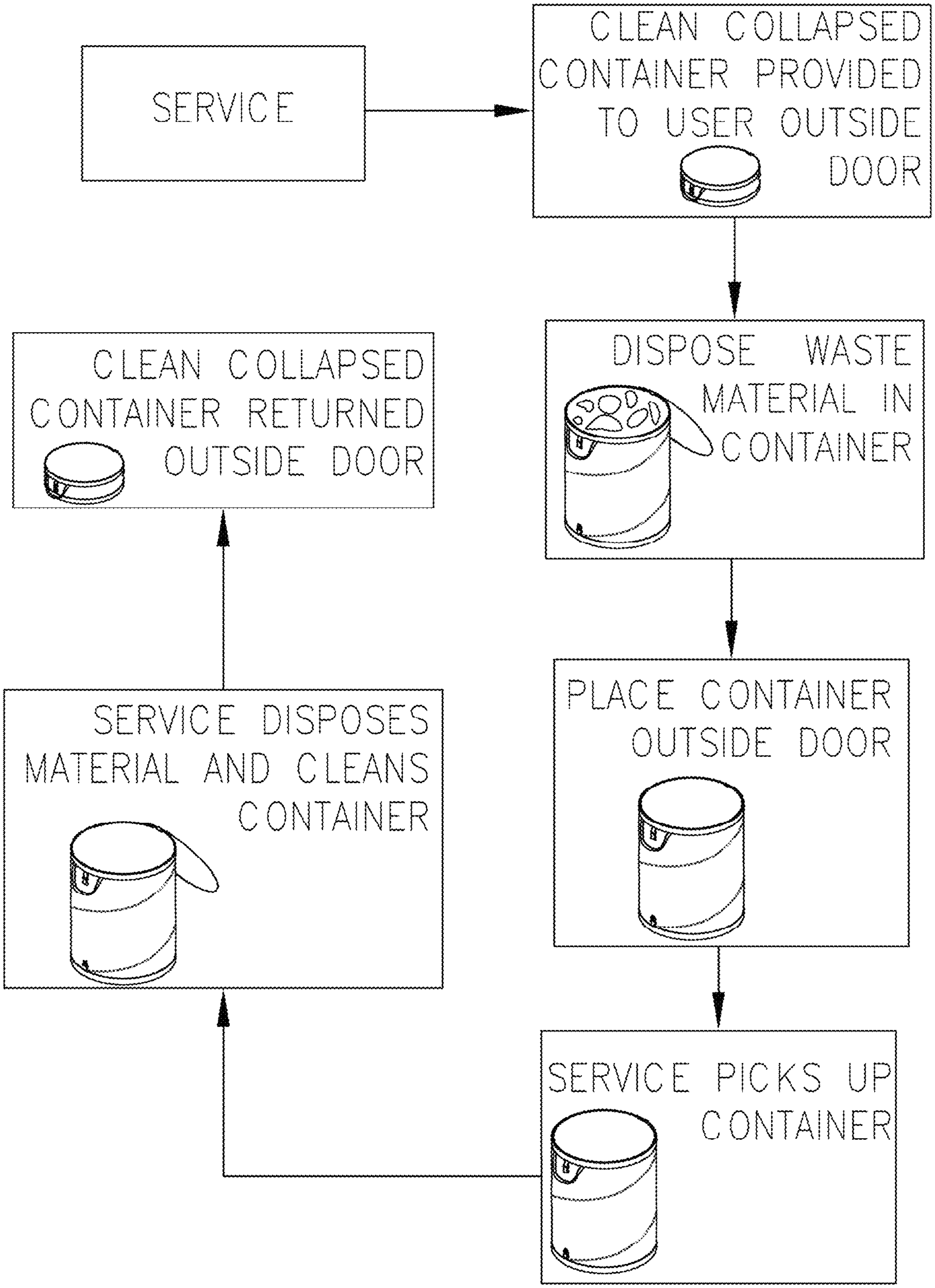
FIG. 11 depicts a schematic view of a method of rubbish removal according to the present invention.

FIG. 11 depicts a schematic view of a method of rubbish removal according to the present invention. In a preferred embodiment, the present invention comprises some combination of the following basic steps: (1) at least one clean portable container 10 is provided to a user, typically in a collapsed configuration; (2) said user opens said at least one portable container 10 to an expanded configuration, and deposits rubbish or other material in said at least one portable container 10; (3) said user places said at least one portable container 10 and contents in a predetermined location for collection (such as, for example, in accordance with the location in a hallway outside a door as depicted in FIG. 9); (4) said at least one portable container 10 is emptied at said location or, alternatively, is transported to a different location (such as a dumpster, garbage truck or other predetermined collection or disposal site) for emptying; (5) after said rubbish or other contents have been removed, said portable container 10 is cleaned and/or disinfected, such as by mechanical application of biocide agent(s) in the form of a mist to removable liner 40; and (6) said at least one portable container 10 is returned to said user. Although other methods of return can be employed, said at least one (cleaned and disinfected) portable container 10 can be collapsed to conserve space with lid member 13 closed and zipped using zipper 14, latched in a collapsed configuration using quick-connect buckle(s) 17, and hung from a door knob 103 as depicted in FIG. 10. If desired, removable liner 40 can be removed and replaced with a clean removable liner 40.

It will be apparent to a person having ordinary skill in the art that the present disclosure may be practiced without these specific details. In other instances, features which are well known to persons of ordinary skill in the art have not been described in detail to avoid unnecessary complication of the description. It is intended that all alternatives, substitutions, modifications, and equivalents apparent to those having ordinary skill in the art are included within the scope of the present disclosure. Thus, while the apparatus and methods of the present disclosure have been described in terms of particular embodiments, it will be apparent to those of skill in the art that variations may be applied to the apparatus and methods and the steps or in the sequence of steps of the methods described herein without departing from the concept, spirit, and scope of the inventive concepts.

The subject matter of the present invention is described with specificity herein to meet statutory requirements. However, the description itself is not intended to necessarily limit the scope of the disclosure. Rather, the claimed subject matter might be embodied in other ways to include different steps or combinations of steps similar to the ones described in this document, in conjunction with other present or future technologies. Although the terms "step" and/or "block" or "module" etc. might be used herein to connote different components of methods or systems employed, the terms should not be interpreted as implying any particular order among or between various steps herein disclosed unless and except when the order of individual steps is explicitly described.

Furthermore, the described features, structures, or characteristics may be combined in any suitable manner in one or more embodiments. In the following description, numerous specific details are provided. One skilled in the relevant art will recognize, however, that the method and technology may be practiced without one or more of the specific details, or with other methods, components, materials, and so forth. In other instances, well-known structures, materials, or operations are not shown or described in detail to avoid obscuring aspects of the invention.

What is claimed is:

1. A method of collecting and disposing of trash in a multi-unit structure comprising:

a) providing a collapsable container comprising:
  i) an interconnected side wall defining an internal compartment;
  ii) a base;
  iii) a spring configured to bias said side wall in an expanded configuration;
  iv) at least one latch member configured to selectively lock said collapsable container in a collapsed configuration;
  v) a lid hingedly attached to said side wall, wherein said lid is configured to selectively alternate between an open configuration and a closed configuration;
  vi) a removable liner member disposed in said internal compartment;
  vii) at least one strap handle;
b) placing trash in said liner member in said internal compartment;
c) depositing said collapsable container at a predetermined location outside a door;
d) removing trash from said collapsable container according to a predetermined schedule;
e) applying at least one disinfectant to said liner member;
f) collapsing said collapsable container;
g) locking said collapsable container in said collapsed configuration; and
h) returning said collapsable container by hanging said collapsable container from a door knob of said door.

2. The method of claim 1, wherein said removable liner member further comprises polyethylene sheet film composite membrane.

3. The method of claim 2, wherein said step of applying at least one disinfectant to said liner member comprises applying at least one biocide agent.

4. The method of claim 3, wherein said at least one biocide agent is applied in mist form.

5. The method of claim 3, wherein said collapsable container further comprises a canvas outer shell.

6. A method of collecting and disposing of trash in an apartment complex comprising:

a) providing a collapsable container to residents of said apartment complex, wherein each of said collapsable containers comprises:
  i) an interconnected side wall defining an internal compartment;
  ii) a base;
  iii) a spring configured to bias said side wall in an expanded configuration;
  iv) at least one latch member configured to selectively lock said collapsable container in a collapsed configuration;
  v) a lid hingedly attached to said side wall, wherein said lid is configured to selectively alternate between an open configuration and a closed configuration;

vi) a removable liner member disposed in said internal compartment;

vii) at least one strap handle;

b) passing by a plurality of apartment doors on a predetermined schedule;

c) removing trash from said collapsable containers, wherein said collapsable containers are deposited outside said apartment doors by apartment residents;

d) collapsing said collapsable containers;

e) locking said collapsable containers in said collapsed configuration; and f) returning said collapsable containers by hanging said collapsable container from door knobs of said apartment doors.

7. The method of claim 6, wherein said removable liner member further comprises polyethylene sheet film composite membrane.

8. The method of claim 7, further comprising the step of applying at least one disinfectant to at least one of said liner members.

9. The method of claim 8, wherein said step of applying at least one disinfectant to at least one of said liner members comprises applying at least one biocide agent to at least one of said removable liner members.

10. The method of claim 9, wherein said at least one biocide agent is applied in mist form.

* * * * *